(12) United States Patent
Pham et al.

(10) Patent No.: US 7,803,015 B2
(45) Date of Patent: Sep. 28, 2010

(54) QUICK-MOUNT RELAY APPARATUS AND METHOD OF INSTALLATION

(75) Inventors: Thi N. Pham, Seattle, WA (US); Tord Kurthy, Renton, WA (US); David R. Gladish, Newcastle, WA (US); Jeffrey M. Komatsu, Renton, WA (US); Michael A. Pham, Renton, WA (US); Eugene T. Rogers, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 36 days.

(21) Appl. No.: 12/189,989

(22) Filed: Aug. 12, 2008

(65) Prior Publication Data

US 2010/0041269 A1 Feb. 18, 2010

(51) Int. Cl.
*H01R 13/73* (2006.01)
(52) U.S. Cl. ...................................................... 439/555
(58) Field of Classification Search ......... 439/552–557, 439/533, 536, 544, 953; 200/296–5; 401/508–510, 401/913; 411/510
See application file for complete search history.

(56) References Cited

U.S. PATENT DOCUMENTS

| | | | | | |
|---|---|---|---|---|---|
| 2,193,268 | A | * | 3/1940 | Catron et al. | 200/16 C |
| 3,514,743 | A | * | 5/1970 | Schantz | 439/557 |
| 3,523,269 | A | * | 8/1970 | Bissland et al. | 439/358 |
| 3,708,642 | A | | 1/1973 | Hollingsead et al. | |
| 3,753,212 | A | * | 8/1973 | Yamada et al. | 439/358 |
| 3,812,450 | A | | 5/1974 | Simovits, Jr. et al. | |
| 4,032,209 | A | | 6/1977 | Rutkowski | |
| 4,400,672 | A | | 8/1983 | Bottelson | |
| 4,453,195 | A | * | 6/1984 | Sauer et al. | 361/156 |
| 4,454,397 | A | * | 6/1984 | Kim | 200/296 |
| 4,591,203 | A | * | 5/1986 | Furman | 296/201 |
| 4,812,133 | A | * | 3/1989 | Fleak et al. | 439/248 |
| 5,588,858 | A | * | 12/1996 | Lester et al. | 439/275 |
| 5,766,035 | A | | 6/1998 | Alibert | |
| 6,257,925 | B1 | * | 7/2001 | Jones | 439/557 |
| 6,315,606 | B1 | * | 11/2001 | Hwang | 439/557 |
| 6,315,607 | B1 | * | 11/2001 | Hwang et al. | 439/557 |
| 6,629,852 | B2 | | 10/2003 | Mori et al. | |
| 6,692,310 | B2 | * | 2/2004 | Zaderej et al. | 439/701 |

(Continued)

FOREIGN PATENT DOCUMENTS

DE 3641427 A1 6/1988

(Continued)

OTHER PUBLICATIONS

Great Britain Intellectual Property Office; Search Report for GB Application No. GB0913587.2; Date of Search Dec. 14, 2009.

(Continued)

*Primary Examiner*—Renee Luebke
*Assistant Examiner*—Larisa Tsukerman
(74) *Attorney, Agent, or Firm*—Klintworth & Rozenblat IP LLC

(57) ABSTRACT

A relay socket may include an opening for insertion of a relay into the opening, and a plurality of integral locking members for attaching and locking the relay socket to at least one of a structure surface and a relay without the use of attachment hardware.

32 Claims, 3 Drawing Sheets

U.S. PATENT DOCUMENTS

| | | | |
|---|---|---|---|
| 6,767,246 B2 * | 7/2004 | Quinn et al. | 439/555 |
| 2002/0142643 A1 | 10/2002 | Quinn et al. | |
| 2007/0147975 A1 * | 6/2007 | Homner | 411/510 |

FOREIGN PATENT DOCUMENTS

| | | |
|---|---|---|
| EP | 1357570 A3 | 3/2005 |
| EP | 1803867 A1 | 7/2007 |
| GB | 1171724 | 11/1969 |
| GB | 2310550 | 8/1997 |
| JP | 5102706 U | 2/1976 |
| JP | 51027061 U | 2/1976 |
| JP | 54091638 U | 6/1979 |
| JP | 2006032285 | 2/2006 |

OTHER PUBLICATIONS

Intellectual Property office of Great Britain, Search Report for Great Britain Patent Application No. GB0913587.2 mailed Mar. 15, 2010.

* cited by examiner

QUICK-MOUNT RELAY APPARATUS AND METHOD OF INSTALLATION

FIELD OF THE DISCLOSURE

This disclosure relates to relay apparatus, relay sockets, and to methods of attachment.

BACKGROUND OF THE DISCLOSURE

Many of the existing relay apparatus, relay sockets, and/or methods of attachment utilize non-integral attachment hardware, such as washers, spacers, nuts, and screws, and/or tools in order to attach a relay socket to a structure surface and/or to a relay. This may make the assembly process difficult, may require significant installation time, may lead to significant costs due to the attachment hardware and/or tools needed, may lead to significant weight due to the attachment hardware, may result in attachment hardware becoming dislodged and/or needing replacement, and/or may lead to one or more other types of problems. Other existing relay apparatus, relay sockets, and/or methods of attachment may utilize clip-on hinged sockets which may require costly and timely structure surface cutouts.

A relay apparatus, relay socket, and/or method of attachment is needed to decrease one or more problems associated with one or more of the existing relay apparatus, relay sockets, and/or methods of attachment.

SUMMARY OF THE DISCLOSURE

In one aspect of the disclosure, a relay socket may comprise an opening for insertion of a relay into the opening, and a plurality of integral locking members for attaching and locking the relay socket to at least one of a structure surface and a relay without the use of attachment hardware.

In another aspect of the disclosure, a relay apparatus may include: a relay socket comprising an opening and a plurality of integral locking members; a structure surface comprising a plurality of first holes; and a relay comprising a plurality of second holes. The relay socket may be locked against the structure surface without the use of attachment hardware as a result of the plurality of integral locking members extending through the plurality of first holes of the structure surface. The relay may be locked within at least a portion of the opening of the relay socket without the use of attachment hardware as a result of the plurality of integral locking members extending through the plurality of second holes of the relay.

In a further aspect of the disclosure, a method may be provided for attaching a relay apparatus. In one step, a relay apparatus may be provided comprising: a relay socket comprising an opening and a plurality of integral locking members; a structure surface comprising a plurality of first holes; and a relay comprising a plurality of second holes. In another step, the relay socket may be attached to the structure surface without the use of attachment hardware by extending the plurality of integral locking members of the relay socket through the plurality of first holes of the structure surface. In still another step, the relay may be attached within at least a portion of the opening of the relay socket without the use of attachment hardware by extending the plurality of integral locking members of the relay socket through the plurality of second holes of the relay.

These and other features, aspects and advantages of the disclosure will become better understood with reference to the following drawings, description and claims.

DETAILED DESCRIPTION OF THE DISCLOSURE

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
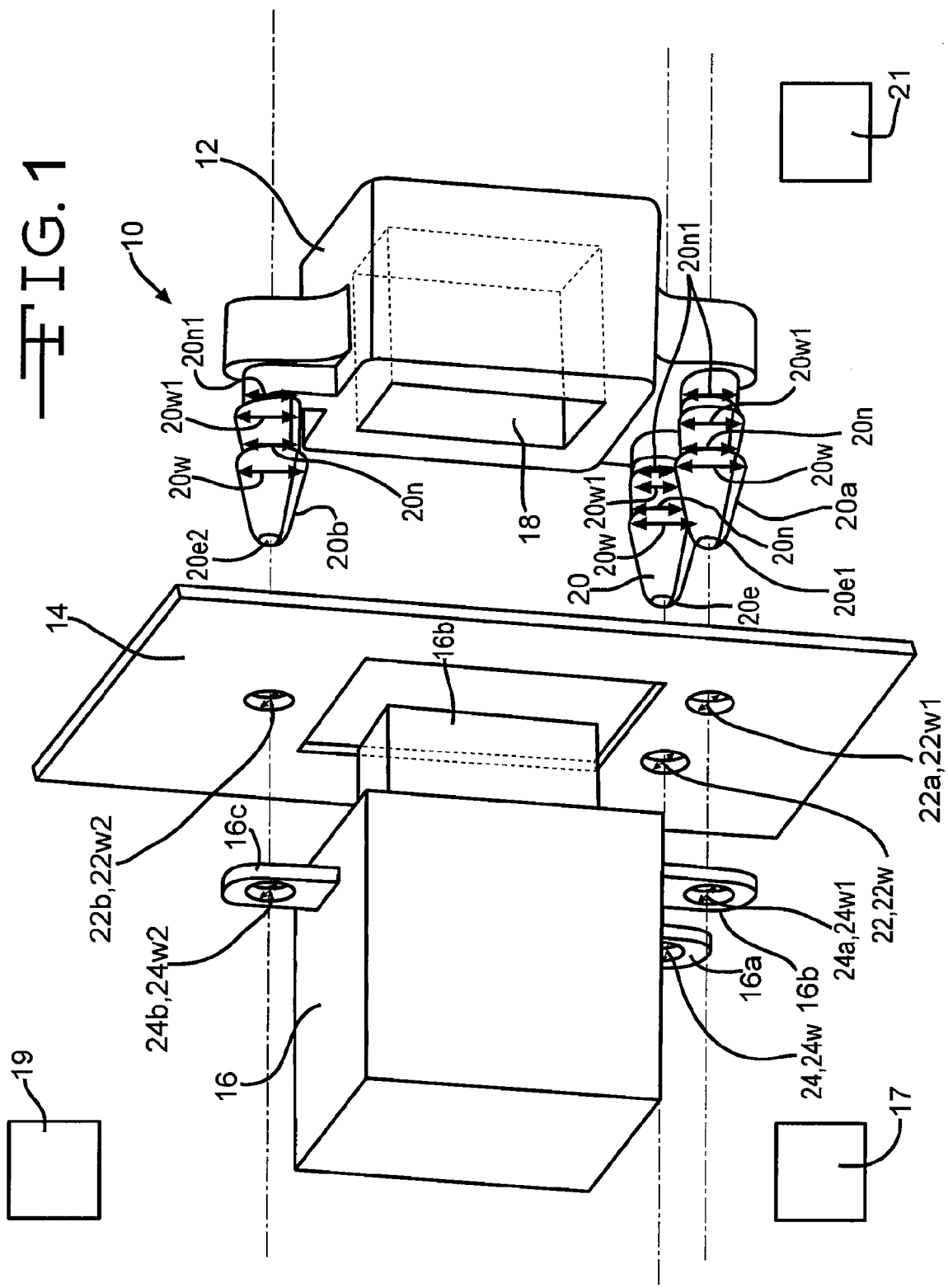
FIG. 1 shows a perspective, unassembled view of one embodiment of a relay apparatus.
Figure 2:
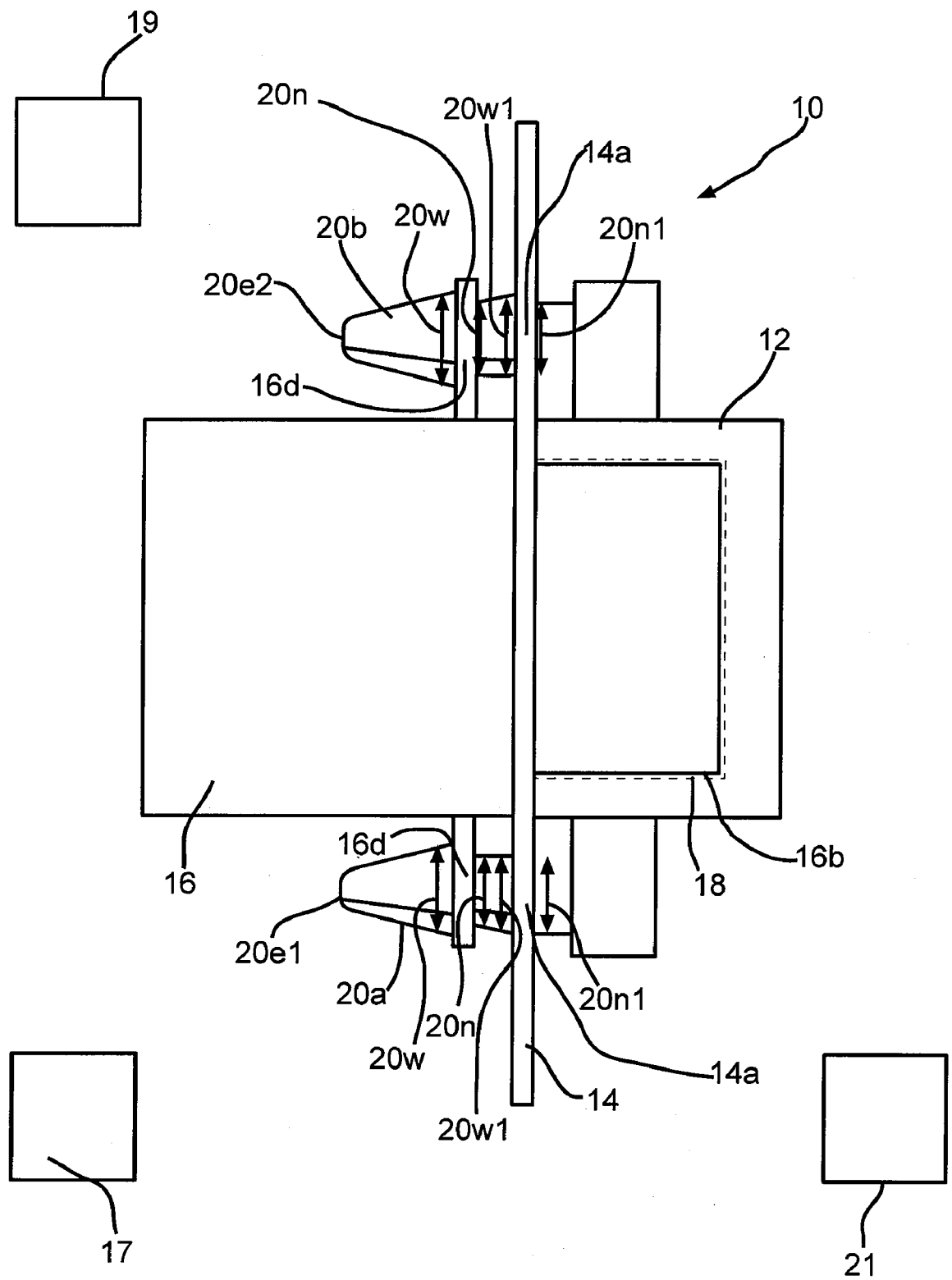
FIG. 2 shows a side, assembled view of the embodiment of FIG. 1.

FIG. 1 shows a perspective, unassembled view of one embodiment of a relay apparatus 10. FIG. 2 shows a side, assembled view of the embodiment of FIG. 1. As shown in FIGS. 1 and 2, the relay apparatus 10 may comprise a relay socket 12, a structure surface 14, and a relay 16. The relay socket 12 may comprise an opening 18 for insertion of a portion 16b of the relay 16 into the opening 18, and a plurality of integral locking members 20, 20a, and 20b for locking the relay socket 12 to the structure surface 14 and/or to the relay 16. The integral locking members 20, 20a, and 20b may be integrally molded/manufactured as an integral part of the integral relay socket 12.

The integral locking members 20, 20a, and 20b may each be made of a flexible material, a plastic, a nylon, and/or another type of flexible material to allow the integral locking members 20, 20a, and 20b to compress and expand. Each integral locking member 20, 20a, and 20b may comprise two wider portions 20w and 20w1 which are each adjacent to respective, adjacent narrow portions 20n and 20n1 which may be narrower than the two respective wider portions 20w and 20w1. The respective wider portions 20w and 20w1 may be disposed closer to the respective outer ends 20e, 20e1, and 20e2 of the respective integral locking members 20, 20a, and 20b than each of their respective narrow portions 20n and 20n1. The wider portions 20w and 20w1 may be conically shaped. The narrow portion 20n may be conically shaped while the narrow portion 20n1 may be circularly shaped. In other embodiments, the relay socket 12 may comprise any number, size, shape, and type of integral locking members 20, 20a, and 20b which may comprise any number, size, shape, and type of wider portions 20w and 20w1 and narrow portions 20n and 20n1. For instance, in one embodiment each integral locking member 20, 20a, and 20b may comprise only one wider portion 20w and only one narrow portion 20n which is narrower than the wider portion 20w.

The structure surface 14 may comprise a plurality of first holes 22, 22a, and 22b. In other embodiments, the structure surface 14 may comprise any number, shape, size, alignment, and type of first holes 22, 22a, and 22b. The structure surface 14 may comprise a panel of an aircraft, a vehicle, an electrical component, or other type of structure surface. The relay 16 may comprise an electrical component for controlling one or more circuits 19. The relay 16 may comprise a plurality of second holes 24, 24a, and 24b in mounting surfaces 16a, 16b, and 16c. In other embodiments, the relay 16 may comprise any number, shape, size, alignment, and type of second holes 24, 24a, and 24b in varying surfaces.

The wider portions 20w and 20w1 of the integral locking members 20, 20a, and 20b may be wider when expanded than the widths 22*w*, 22*w*1, and 22*w*2, and 24*w*, 24*w*1, and 24*w*2 of the respective first holes 22, 22*a*, and 22*b* and the respective second holes 24, 24*a*, and 24*b*. The wider portions 20*w* and 20*w*1 may be flexible to allow them to compress when extended through the plurality of first holes 22, 22*a*, and 22*b* and/or second holes 24, 24*a*, and 24*b*, and to expand after they are extended through the plurality of first holes 22, 22*a*, and 22*b* and/or second holes 24, 24*a*, and 24*b*. In such manner, portions 14*a* of the structure surface 14 and portions 16*d* of the relay 16 may be locked between the respective wider portions 20*w* and 20*w*1 and the respective, adjacent narrow portions 20*n* and 20*n*1 of the integral locking members 20, 20*a*, and 20*b*. In other embodiments, various portions of variably shaped, sized, numbered, and types of integral locking members 20, 20*a*, and 20*b* may be flexible enough to compress and expand in order to lock the relay socket 12 to the structure surface 14 and/or relay 16.

The relay socket 12 may be locked against the structure surface 14 without the use of attachment hardware 17, such as spacers, nuts, washers, bolts, and/or other attachment hardware, and/or without the use of tools 21, due to the plurality of integral locking members 20, 20*a*, and 20*b* extending through the plurality of first holes 22, 22*a*, and 22*b* of the structure surface 14. A portion 16*b* of the relay 16 may be locked within the opening 18 of the relay socket 12 without the use of attachment hardware 17, and/or without the use of tools 21, due to the plurality of integral locking members 20, 20*a*, and 20*b* extending through the plurality of second holes 24, 24*a*, and 24*b* of the relay 16. In other embodiments, the relay socket 12 may be locked against the structure surface 14 and/or relay 16 using a varying number, type, size, shape, and alignment of integral locking members 20, 20*a*, and 20*b*.

Figure 3:
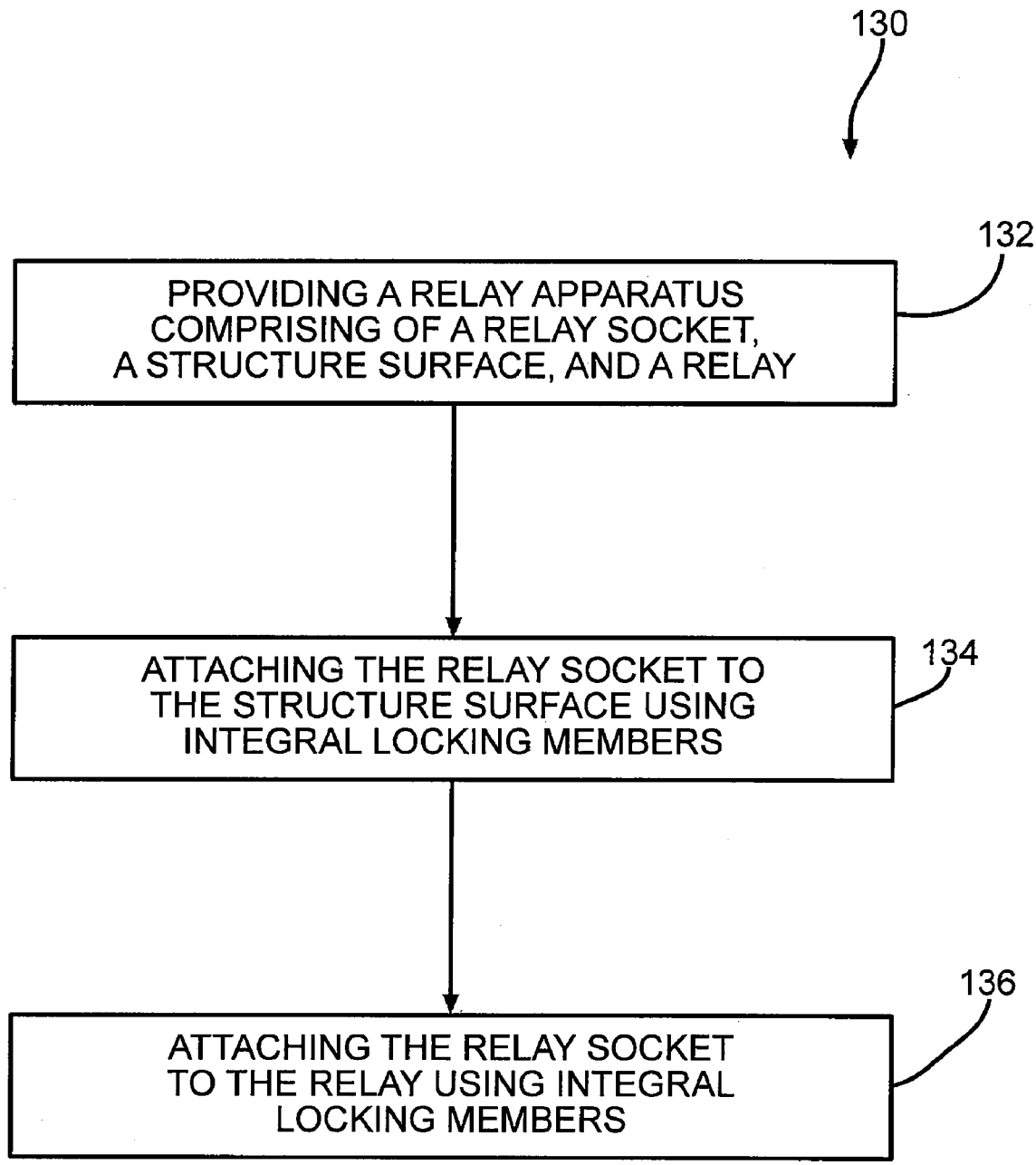
FIG. 3 shows a flowchart of one embodiment of a method for attaching a relay apparatus.

FIG. 3 shows a flowchart of one embodiment of a method 130 for attaching a relay apparatus 10. In one step 132, a relay apparatus 10 may be provided comprising a relay socket 12, a structure surface 14, and a relay 16. The relay socket 12 may comprise an opening 18 and a plurality of integral locking members 20, 20*a*, and 20*b*. Each of the provided integral locking members 20, 20*a*, and 20*b* may comprise two wider portions 20*w* and 20*w*1 and two narrow portions 20*n* and 20*n*1 which are more narrow than the wider portions 20*w* and 20*w*1. Both of the wider portions 20*w* and 20*w*1 may be conically shaped. The narrow portions 20*n* and 20*n*1 may be conically and/or circularly shaped with each of the wider portions 20*w* and 20*w*1 being adjacent to one of the narrow portions 20*n* and 20*n*1. The structure surface 14 may comprise a plurality of first holes 22, 22*a*, and 22*b*. The relay 16 may comprise a plurality of second holes 24, 24*a*, and 24*b*. In other embodiments, the relay apparatus 10 may comprise varying numbers, types, sizes, shapes, and alignments of relay sockets 12, structure surfaces 14, and relays 16, including each of their respective components.

In another step 134, the relay socket 12 may be attached to the structure surface 14 without the use of attachment hardware 17, such as spacers, nuts, washers, bolts, and/or other types of attachment hardware, by extending the plurality of integral locking members 20, 20*a*, and 20*b* of the relay socket 12 through the plurality of first holes 22, 22*a*, and 22*b* of the structure surface 14. In one embodiment, step 134 may comprise compressing wider portions 20*w* and 20*w*1 of the integral locking members 20, 20*a*, and 20*b* as they extend through the less wide first holes 22, 22*a*, and 22*b* of the structure surface 14, and expanding the wider portions 20*w* and 20*w*1 of the integral locking members 20, 20*a*, and 20*b* after they extend through the less wide first holes 22, 22*a*, and 22*b* of the structure surface 14 in order to lock portions 14*a* of the structure surface 14 between the wider portions 20*w* and 20*w*1 of the integral locking members 20, 20*a*, and 20*b* and more narrow portions 20*n* and 20*n*1 of the integral locking members 20, 20*a*, and 20*b*. In still another embodiment, step 134 may be done without the use of any tools 21 by a user pushing the integral locking members 20, 20*a*, and 20*b* of the relay socket 12 through the plurality of first holes 22, 22*a*, and 22*b* of the structure surface 14 in order to attach the relay socket 12 to the structure surface 14. In yet another embodiment, step 134 may be done using varying numbers, shapes, sizes, types, and alignments of integral locking members 20, 20*a*, and 20*b*.

In an additional step 136, the relay 16 may be attached within at least a portion 18*a* of the opening 18 of the relay socket 12 without the use of attachment hardware 17, such as spacers, nuts, washers, bolts, and/or other types of attachment hardware, by extending the plurality of integral locking members 20, 20*a*, and 20*b* of the relay socket 12 through the plurality of second holes 24, 24*a*, and 24*b* of the relay 16. In one embodiment, step 136 may comprise compressing wider portions 20*w* and 20*w*1 of the integral locking members 20, 20*a*, and 20*b* as they extend through the less wide second holes 24, 24*a*, and 24*b* of the relay 16, and expanding the wider portions 20*w* and 20*w*1 of the integral locking members 20, 20*a*, and 20*b* after they extend though the less wide second holes 24, 24*a*, and 24*b* of the relay 16 in order to lock portions 16*d* of the relay 16 between the wider portions 20*w* and 20*w*1 of the integral locking members 20, 20*a*, and 20*b* and more narrow portions 20*n* and 20*n*1 of the integral locking members 20, 20*a*, and 20*b*. In still another embodiment, step 136 may be done without the use of any tools 21 by a user pushing the integral locking members 20, 20*a*, and 20*b* of the relay socket 12 through the plurality of second holes 24, 24*a*, and 24*b* of the relay 16 in order to dispose/attach at least a portion 18*a* of the relay 16 into the opening 18 of the relay socket 12. In yet another embodiment, step 136 may be done using varying numbers, shapes, sizes, types, and alignments of integral locking members 20, 20*a*, and 20*b*.

The disclosed relay apparatus, relay socket, and/or methods of attachment of a relay apparatus may reduce one or more problems associated with one or more of the prior art apparatus, relay sockets, and/or methods of attachment. For instance, one or more embodiments of the relay apparatus, relay socket, and/or methods of attachment herein disclosed may make the assembly process less difficult, may provide reduced installation time, may lower costs due to the elimination of attachment hardware and/or tools, may reduce weight, may reduce the likelihood of attachment hardware becoming dislodged and/or needing replacement, and/or may reduce one or more other types of problems associated with one or more of the prior art relay apparatus, relay sockets, and/or methods of attachment.

It should be understood, of course, that the foregoing relates to exemplary embodiments of the disclosure and that modifications may be made without departing from the spirit and scope of the disclosure as set forth in the following claims.

We claim:

1. A relay apparatus comprising a relay socket and a relay; the relay comprising a plurality of holes; and
the relay socket comprising an opening for insertion of the relay into the opening, and a plurality of flexible integral locking members for attaching and locking the relay socket to the holes of the relay without the use of attachment hardware;
wherein each flexible integral locking member comprises two wider portions and two respective narrow portions which are more narrow than their respective wider portions, and one of the two wider portions or one of the two narrow portions is conically shaped; and wherein one of the two wider portions of each flexible integral locking member is wider than the holes of the relay so that when the flexible integral locking members are extended through the respective holes of the relay, the one wider portion of each flexible integral locking member is adapted to compress upon entry into the respective hole of the relay and to then expand after passing through the respective hole of the relay in order to attach and lock the relay socket to the relay, and wherein the other wider portion of each flexible locking member is wider than holes of a structure surface so that when the flexible integral locking members are extended through the holes of the structure surface, the other wider portion of each flexible integral locking member is adapted to compress upon entry into the respective hole of the structure surface and to then expand after passing through the respective hole of the structure surface in order to attach and lock the relay socket to the structure surface.

2. The relay socket of claim 1 wherein each of the wider portions are adjacent to their respective narrow portions, and each of the wider portions are disposed closer to an outer end of the integral locking member than their respective narrow portions.

3. The relay socket of claim 1 wherein both of the wider portions are conically shaped and the narrow portions are circularly-shaped or conically shaped with each of the wider portions being adjacent to one of the narrow portions.

4. The relay socket of claim 1 wherein the relay is attached to the relay socket with each flexible integral locking member extended through each respective hole of the relay and the one wider portion of each flexible integral locking member expanded and fixedly disposed against a respective surface of the relay locking the relay in place relative to the relay socket.

5. The relay socket of claim 4 wherein each flexible integral locking member is also extended through each respective hole of the structure surface, the structure surface comprising a panel, with the other wider portion of each flexible integral locking member expanded and fixedly disposed against the panel locking the panel in place in between the relay and the relay socket.

6. The relay socket of claim 1 wherein the flexible integral locking members are made of plastic or nylon.

7. The relay socket of claim 1 wherein there are three flexible integral locking members.

8. The relay socket of claim 1 wherein the attachment hardware comprises spacers, nuts, washers, and bolts, and the flexible integral locking members allow the attachment of the relay socket to the structure surface and to the relay without the use of tools.

9. A relay apparatus comprising:
a relay socket comprising an opening and a plurality of integral locking members;
a structure surface comprising a plurality of first holes; and
a relay comprising a plurality of second holes, wherein the relay socket is locked against the structure surface without the use of attachment hardware as a result of the plurality of integral locking members extending through the plurality of first holes of the structure surface, and the relay is locked within at least a portion of the opening of the relay socket without the use of attachment hardware as a result of the plurality of integral locking members extending through the plurality of second holes of the relay.

10. The relay apparatus of claim 9 wherein each integral locking member comprises at least one wider portion and at least one narrow portion which is more narrow than the wider portion.

11. The relay apparatus of claim 10 wherein the at least one wider portion compressed as it was extended through the plurality of first and second holes and expanded after it was extended through the plurality of first and second holes to lock a portion of the structure surface and a portion of the relay between the at least one wider portion and the at least one narrow portion.

12. The relay apparatus of claim 11 wherein the at least one wider portion is wider when expanded than widths of the first and second holes.

13. The relay apparatus of claim 11 wherein each integral locking member is made of at least one of a flexible material, plastic, or nylon.

14. The relay apparatus of claim 10 wherein at least one of the at least one wider portion or the at least one narrow portion is conically shaped.

15. The relay apparatus of claim 10 wherein each integral locking member comprises two wider portions and two narrow portions.

16. The relay apparatus of claim 15 wherein both of the wider portions are conically shaped and the narrow portions are at least one of circularly-shaped or conically shaped with each of the wider portions being adjacent to one of the narrow portions.

17. The relay apparatus of claim 9 wherein the structure surface comprises a panel, and the attachment hardware comprises spacers, nuts, washers, and bolts.

18. The relay apparatus of claim 9 wherein the relay socket is locked against the structure surface without the use of tools, the relay is locked within the portion of the opening of the relay socket without the use of tools, and the relay comprises an electrical component for controlling one or more circuits.

19. A method for attaching a relay apparatus comprising:
providing a relay apparatus comprising: a relay socket comprising an opening and a plurality of integral locking members; a structure surface comprising a plurality of first holes; and a relay comprising a plurality of second holes;
attaching the relay socket to the structure surface without the use of attachment hardware by extending the plurality of integral locking members of the relay socket through the plurality of first holes of the structure surface; and
attaching the relay within at least a portion of the opening of the relay socket without the use of attachment hardware by extending the plurality of integral locking members of the relay socket through the plurality of second holes of the relay.

20. The method of claim 19 wherein the attaching the relay socket to the structure surface step comprises compressing wider portions of the integral locking members as they extend through the less wide first holes of the structure surface and expanding the wider portions of the integral locking members after they extend through the less wide first holes of the structure surface in order to lock portions of the structure surface between the wider portions of the integral locking members and more narrow portions of the integral locking members.

21. The method of claim 19 wherein the attaching the relay within at least a portion of the opening of the relay socket step comprises compressing wider portions of the integral locking members as they extend through the less wide second holes of the relay and expanding the wider portions of the integral locking members after they extend though the less wide second holes of the relay in order to lock portions of the relay between the wider portions of the integral locking members and more narrow portions of the integral locking members.

22. The method of claim 19 wherein the attachment hardware comprises spacers, nuts, washers, and bolts, and the attaching steps are done without the use of tools.

23. The method of claim 19 wherein each of the provided integral locking members comprise two wider portions and two narrow portions which are more narrow than the wider portions, wherein both of the wider portions are conically shaped and the narrow portions are at least one of circularly-shaped or conically shaped with each of the wider portions being adjacent to one of the narrow portions.

24. A relay socket comprising an opening for insertion of a relay into the opening and a plurality of integral locking members, wherein each integral locking member comprises multiple sets of alternating wider portions and narrower portions, the wider portions being wider than their respective narrower portions, the multiple sets comprising a first wider portion alternated with a first narrower portion, alternated with a second wider portion, alternated with a second narrower portion, wherein the first wider portion of each integral locking member fixedly retains a relay in place relative to the relay socket, and the second wider portion of each integral locking member fixedly retains a structure surface in place between the relay and the relay socket.

25. The relay socket of claim 24 wherein the first and the second narrower portions are each narrower than both of the first and the second wider portions.

26. The relay socket of claim 24 wherein at least one of the first wider portion, the first narrower portion, the second wider portion, or the second narrower portion is conically shaped.

27. The relay socket of claim 26 wherein both of the first and the second wider portions are conically shaped and each of the first and the second narrower portions are at least one of circularly-shaped or conically shaped.

28. The relay socket of claim 24 wherein each integral locking member is flexible.

29. The relay socket of claim 28 wherein the integral locking members are made of plastic or nylon.

30. The relay socket of claim 24 wherein there are three integral locking members.

31. The relay socket of claim 24 wherein the structure surface comprises a panel, and the integral locking members of the relay socket lock the relay and the panel in place relative to the relay socket without the use of attachment hardware.

32. The relay socket of claim 31 wherein the attachment hardware comprises spacers, nuts, washers, and bolts, and the integral locking members of the relay socket lock the relay and the panel in place relative to the relay socket without the use of tools.

* * * * *